United States Patent
Lee

(10) Patent No.: US 6,574,196 B1
(45) Date of Patent: Jun. 3, 2003

(54) CIRCUIT CALL GENERATOR FOR TESTING FUNCTIONS OF INTERWORKING FUNCTION SYSTEM AND METHOD THEREFOR

(75) Inventor: Choong-leol Lee, Seoul (KR)

(73) Assignee: Samsung Electronics Co., LTD, Suwon (KR)

( * ) Notice: Subject to any disclaimer, the term of this patent is extended or adjusted under 35 U.S.C. 154(b) by 0 days.

(21) Appl. No.: 09/377,397

(22) Filed: Aug. 19, 1999

(30) Foreign Application Priority Data

Aug. 19, 1998 (KR) ............................................. 98-33550

(51) Int. Cl.$^7$ ............................................. G01R 31/08
(52) U.S. Cl. ...................................... 370/241; 370/335
(58) Field of Search ................................ 370/241, 242, 370/248, 244, 249, 250, 314, 320, 321, 342, 344, 465, 479, 252, 310, 310.1, 310.2, 328, 335, 352, 396, 395.2, 395.52, 466

(56) References Cited

U.S. PATENT DOCUMENTS

| 5,404,570 A | 4/1995 | Charas et al. ............... 455/55 |
|---|---|---|
| 5,432,838 A | 7/1995 | Purchase et al. ............ 379/55 |
| 5,596,570 A | 1/1997 | Soliman |
| 5,603,080 A | 2/1997 | Kallander et al. ........... 455/14 |
| 5,619,550 A | * 4/1997 | Averbuch et al. ........... 370/249 |
| 5,764,726 A | 6/1998 | Selig |
| 5,802,105 A | 9/1998 | Tiedemann |
| 5,910,977 A | 6/1999 | Torregrossa |
| 6,052,584 A | * 4/2000 | Harvey et al. ............... 370/241 |
| 6,160,871 A | * 12/2000 | DuRee et al. ............ 379/10.02 |
| 6,269,150 B1 | * 7/2001 | Herrbach et al. ........... 370/244 |

* cited by examiner

Primary Examiner—David Vincent
Assistant Examiner—Brian Nguyen
(74) Attorney, Agent, or Firm—Cha & Reiter

(57) ABSTRACT

A circuit call generator (load box) for functional testing of interworking function (IWF) system and a method for testing the functions of the IWF system are provided. The circuit call generator includes a trunk interface unit for performing communication channel switching between the call generator and the IWF system, a circuit data processing unit for performing emulation of a role of the wireless subscribers or wired subscribers, a circuit data processing unit being connected to the IWF system via the trunk interface unit, a control bus for transmitting control signals between the trunk interface unit and the circuit data processing unit, a data bus for transmitting data between the trunk interface unit and the circuit data processing unit, and a control unit for controlling the emulation of the circuit data processing unit.

16 Claims, 6 Drawing Sheets

CIRCUIT CALL GENERATOR FOR TESTING FUNCTIONS OF INTERWORKING FUNCTION SYSTEM AND METHOD THEREFOR

CLAIM OF PRIORITY

This application makes reference to, incorporates the same herein, and claims all benefits accruing under 35 U.S.C. §119 arising from an application entitled, CIRCUIT CALL GENERATOR FOR TESTING FUNCTIONS OF INTERWORKING FUNCTION SYSTEM AND METHOD THEREFOR, earlier filed in the Korean Industrial Property Office on Aug. 19, 1998, and there duly assigned Serial No. 1998-33550.

1. Field of the Invention

The present invention relates to a circuit call generator (load box) for testing the functions of interworking function (IWF) system. The present invention concerns in particular a method for testing data traffic processing of the interworking function (IWF) system, which provides mobile subscribers with wireless data communication services and facilitates data transfer to a Public Switched Telephone network.

2. Description of the Related Art

FIG. 1 illustrates a conventional network configuration for providing mobile subscribers with radio data communication services in CDMA system. As illustrated in FIG. 1, a mobile/wireless subscriber uses a mobile terminal (MT) 120 for connecting to a terminal equipment (TE) 110, such as personal computer, note book computer, and other equivalent means, to receive radio data communication services from a wired network (i.e. facsimile, internet services, and etc.).

As shown in FIG. 1, a wireless subscriber (TE, MT) 110, 120 transmits a call request message to a base station (BS) 130 in order to establish a communication link via air interface. Then, the base station 130 requests a mobile switching center (MSC) 140 for a call setup via A-interface (as shown by the line labeled A). The mobile switching center (MSC) 140 analyzes the call request message and requests the interworking function (IWF) system 150 to establish a communication path, in the event that radio data communication service is requested in the call request message.

The interworking function (IWF) system 150 is connected to the mobile switching center (MSC) 140 via L-interface (as shown by the line labeled L). The interworking function (IWF) system 150 accesses communication channel to transmit/receive data to/from the wireless subscriber 110, 120. In the event that IWF system receives a request for communication link from the wireless subscriber, the interworking function (IWF) system 150 requests for call connection to the mobile switching center (MSC) 140, which directs the data to the proper place. In response to the request of the interworking function (IWF) system 150, the mobile switching center (MSC) 140 sends an order for call connection request to the wired subscriber of the wired network 160 via the public Switched Telephone Network (PSTN) to either modem 170 or facsimile 190. If the call connection is established with the wired subscriber, the IWF system provides data transfer between the wireless subscriber and the wired subscriber using communication protocols.

In the event that a designer of the communication system has developed a specific interworking function (IWF) system and wants to test the working functions of the IWF system, the designer has to directly connect the interworking function (IWF) system to the wireless network and provide communication services thereon to carry out the test operation. Further, the wireless subscriber should be connected to the wired subscriber of the wired network to see if a fault occurs in the communication path of IWF system. Since testing of the IWF system requires an actual physical connection with both the wireless subscriber and the wired network, it demands for complex network test points and complex test devices, which makes the test operation very expensive. In the known art, there still exists the problem relating to high costs and costly labors associated with testing of the call control processing and the data traffic processing for the interworking function (IWF) system.

SUMMARY OF THE INVENTION

To solve the problem associated with the conventional method, the present invention is intended to provide an apparatus for and method for testing data traffic processing of the interworking function (IWF) system.

One of the objects of the present invention is to provide an apparatus for and method of testing the interworking function (IWF) system in a code division multiple access (CDMA) system by using a circuit call generator to emulate the wireless subscriber and the wired network.

Another object of the present invention is to provide an apparatus for and method of testing the interworking function (IWF) system so that the normal paths of communication through the interworking function (IWF) system are tested by isolating the IWF system from the remainder of the whole network and testing the IWF system.

Further objection of the present invention is to provide a method for testing data traffic processing of the interworking function (IWF) system, which provides mobile subscribers with wireless data communication services and facilitates data transfer to a Public Switched Telephone network.

DESCRIPTION OF THE PREFERRED EMBODIMENTS

Figure 1:
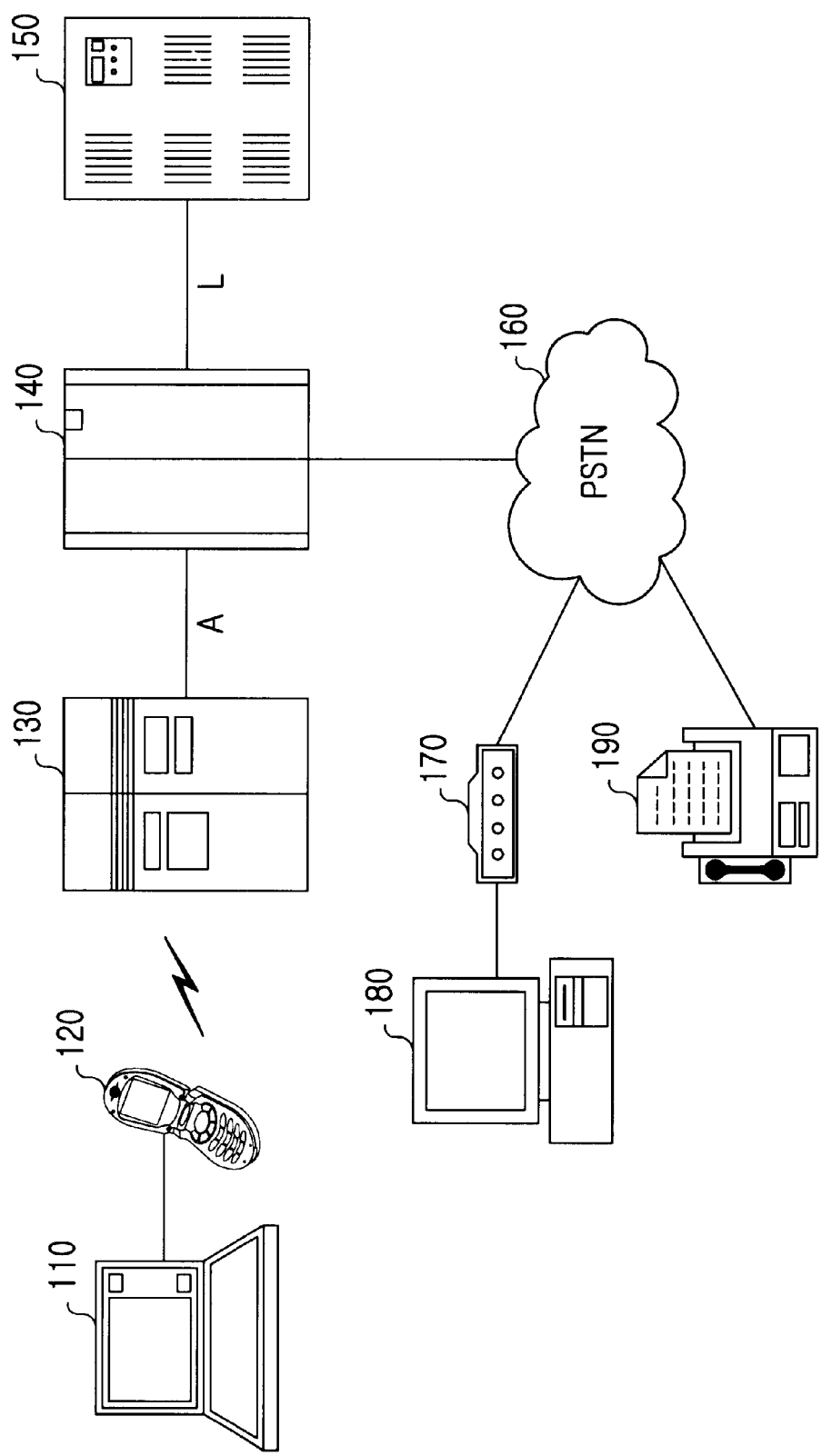
FIG. 1 illustrates a conventional network configuration for providing mobile subscribers with radio data communication services in CDMA systems.

The following describes an apparatus for and method of testing the interworking function (IWF) system in a code division multiple access (CDMA) system. A circuit call generator is provided to emulate the wireless subscriber and the wired network so that the normal paths of communication through the interworking function (IWF) system are tested by isolating the IWF system from the remainder of the whole network.

A preferable embodiment of circuit call generator (load box) for testing interworking function (IWF) system according to the present invention comprising:

a trunk interface unit operatively coupled to the IWF system for transmitting communication signals therebetween, the trunk interface unit having a plurality of time switches defining transmission channels;

a circuit data processing unit operatively coupled to the IWF system via the trunk interface unit;

a control bus operatively coupled to the circuit data processing unit and the trunk interface unit, for transmitting control signals between the circuit data processing unit and the trunk interface unit data bus being a time division multiplex structure and operatively coupled to the circuit data processing unit and the trunk interface unit for transmitting data signals between the circuit data processing unit and the trunk interface unit via the transmission channels of the trunk interface unit; and, a control unit having a display means operatively coupled to the circuit data processing unit for transmitting and/or receiving test information to/from the interworking function system.

It is preferable in the embodiment that the circuit data processing unit comprises:

at least one wireless subscriber unit for emulating a role of an actual wireless subscriber, and at least one wired subscriber unit for emulating a role of actual wired subscriber, wherein each of the at least one wireless subscriber unit and the at least one wired subscriber unit being assigned to one of the transmission channels of the trunk interface unit.

And it is preferable that the circuit data processing unit comprises a switch to establish the communication channel to the data bus, and the trunk interface unit comprises a switch to establish the communication channel to the data bus.

And it is preferable that the control unit generates a call to the interworking function system in accordance with a predetermined call-generating scenario and outputs the result of the generated call statistically.

In accordance with the embodiment of the present invention, the circuit call generator (load box) is interfaced to the interworking function (IWF) system. And it serves to simulate as a wireless subscriber (i.e., a terminal or a mobile telephone) of the wireless network and/or as a wired subscriber (i.e., a modem or a facsimile) of the wired network for testing the IWF system. Thus, the circuit call generator can generate/terminate a call and facilitate data traffic to IWF system, by isolating the IWF system from all other network elements typically found in a digital cellular service system (DCS) or in personal communication services systems. They include mobile terminal, mobile telephone, base station/base station controller, mobile switching center, modem, personal computer, and facsimile.

According to the embodiments of the present invention, the circuit call generator is operatively coupled to the interworking function (IWF) system to simulate the following different types of functions: initiating a call to establish communication paths to a wireless subscriber and a wired subscriber, facilitating data transfer therebetween, and releasing/terminating the established communication path. Thus, the present invention can test all the major functions that the IWF system is designed to provide. The circuit call generator simulates a communication link by employing PPP/IP/TCP protocol as defined in the TIA/EIA IS-99 between wireless subscriber and IWF system, and by employing following protocols between IWF system and wired network (i.e. modem/facsimile): V.22 (an older protocol for used to transfer rate of 1200 bp/s), V.22bis (an older protocol that allows for automatic increase/decrease in speed of the V.22 protocol to 2400 bp/s), V.32 (a newer modem standard that has a line rate of 9600 baud, and a compressed data-transfer rate of 14.4 Kb/s), V.42 (a modern protocol that allows for transfer data at speeds that range from 1200 bp/s to 57.6 Kb/s and up), V.42bis (second edition of V.42), V.29 (a modem standard for transmission rates of 9.6 Kbp/s on private lines), and T.30.

Figure 2:
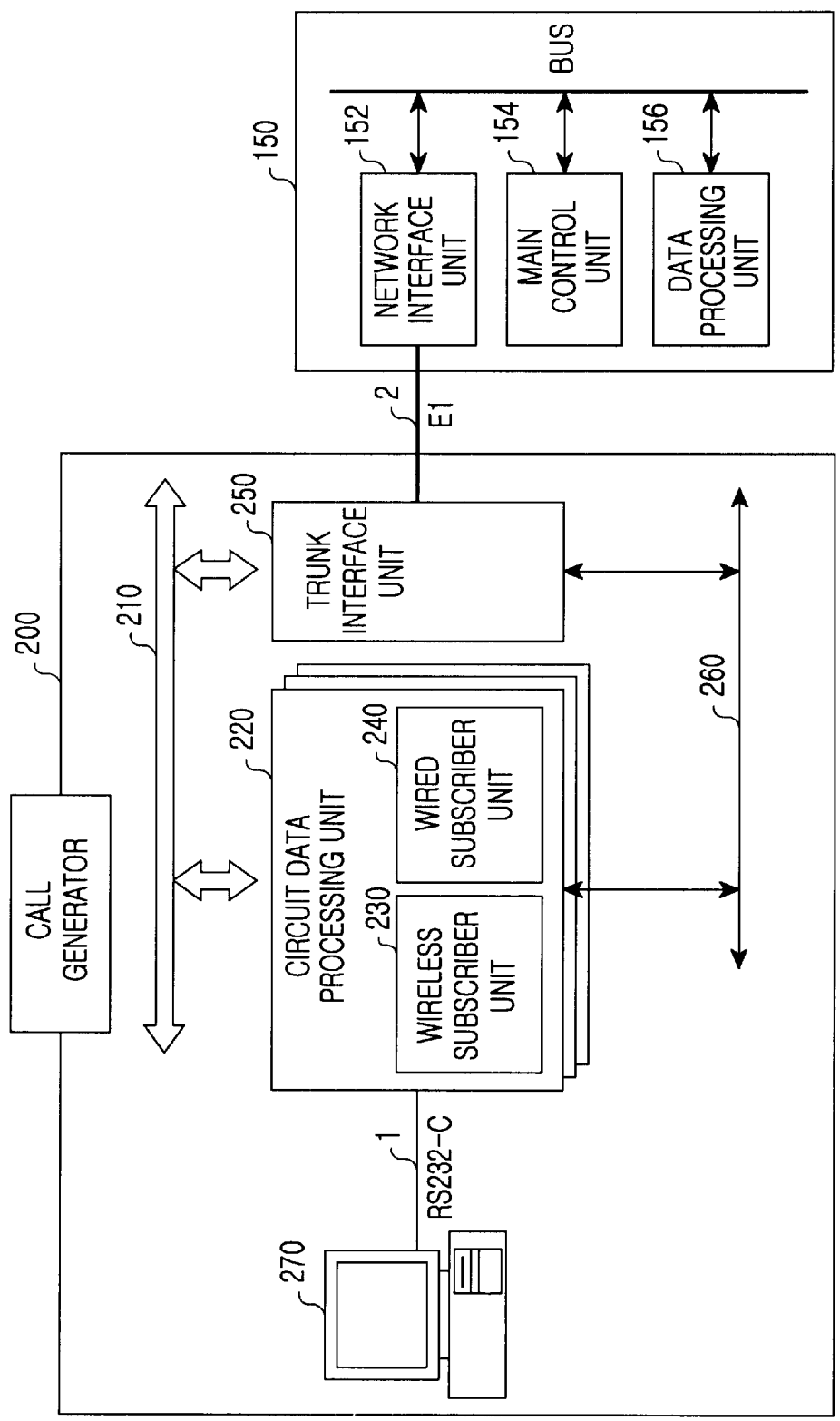
FIG. 2 illustrates a structural diagram of circuit call generator (load box) according to the present invention.

FIG. 2 illustrates a structural diagram of circuit call generator according to the present invention. As illustrated in FIG. 2, the circuit call generator is interfaced to the interworking function (IWF) system (150) via E1 trunk (as shown by the line labeled as 2). The IWF system includes a network interface unit (152), a main control unit (154), and a data processing unit (156).

The circuit call generator (200) includes a trunk interface board (250) assembly operatively coupled to the IWF (150) system and performs the communication therebetween in accordance with the system signaling No. 7 (a method of out-of-band inter office signaling for telephone circuits). The TRIA (250) is coupled to the network interface unit (152) of the IWF system (150) via trunk (E1). The TRIA (250) includes a plurality of switches for connecting the communication path to a circuit data processing unit (220) and the interworking function (IWF) system on different channels. The circuit data processing board assembly (220) having a plurality of switches for defining communication channels and having a wireless subscriber unit (230) and a wired subscriber unit (240) therein is operatively coupled to the interworking function (IWF) system via the TRIA (250) for emulating the functions of actual working wireless subscriber or wired subscriber unit. The circuit generator (200) further includes a VME bus (210) for transmitting the control signal between TRIA (250) and CDPA (220), a time division multiple bus (260) for transmitting data between TRIA (250) and CDPA (220), and a control unit (270) operatively coupled to the CDPA (220) via RS232-C trunk (as shown by the line labeled as 1) for controlling the operation of the circuit call generator, for transmitting/receiving test information to/from the IWF system, and for displaying the test results on a screen. The control unit (270) controls the call generation/termination by the wireless subscriber unit (230), the quantity of calls generated by the wireless subscriber unit (230), and the data transmission between wireless subscriber unit (230) and wired subscriber unit (240).

The circuit call generator (200) according to the present invention includes a plurality of circuit data processing units (220). Preferably, it can equip up to a maximum of eight circuit data processing units (220). Each circuit data processing unit (220) includes at least one wireless subscriber unit (230) and at least one wired subscriber unit (240) for emulating the normal paths of communication through the IWF system.

Further, each circuit data processing unit (220) is capable of having a plurality of wireless subscriber units and a plurality of wired subscriber units. Preferably, each circuit data processing unit (220) can house a maximum of eight wireless subscriber units and eight wired subscriber units. Thus, the circuit call generator (200) in accordance with the present invention is capable of emulating sixty-four wireless subscriber units and sixty-four wired subscriber units, at a maximum. Thus, the present invention can accommodate to test high loads of network elements and high capacity demands associated with the IWF system.

The preferred embodiments of the present invention include testing of the following functions of the IWF system: a) the connection process with the IWF system by the wireless subscriber; b) the connection process with the IWF system by the wired subscriber; c) the process of data transmission between wireless subscriber and wired subscriber via the IWF system; and d) the process of call release by the wireless subscriber. Although the preferred embodiments explain the above stated functions, it should be understood that the present invention is not limited by the above functions and may be applied to test other functions, by applying the method and apparatus that are within the spirit of the present invention. That is, the control unit (270) can store other various call control scenarios in addition to the above-identified events to test various other functions relating to the interworking function (IWF) system.

A first preferable embodiment of a method for testing the functions of an interworking function (IWF) system according to the present invention having a circuit call generator, wherein the circuit call generator having at least one wireless subscriber unit and at least one wired subscriber unit for transmitting/receiving test information to/from the IWF system, the method comprising the steps of:

requesting a call connection to the IWF system by the wireless subscriber unit;

initiating call connection by the IWF system responsive to the requested call connection;

informing the wireless subscriber that the path for the call connection is completed by the IWF system;

connecting the path for the call connection by the wireless subscriber unit;

reporting the completion of the call connection to a control unit;

establishing a wireless subscriber path between the wireless subscriber unit and the IWF system; and, reporting the establishment of the wireless subscriber path to the control unit that by the IWF system.

It is preferable that the step of reporting further comprises a step of displaying the telephone number of the wireless subscriber unit to the control unit.

A second preferable embodiment of a method for testing the functions of an interworking function (IWF) system according to the present invention having a circuit call generator, wherein the circuit call generator having at least one wireless subscriber unit and at least one wired subscriber unit for transmitting/receiving test information to/from the IWF system, the method comprising the steps of:

transmitting a call number to the IWF system via a predetermined wireless subscriber path by the wireless subscriber unit;

requesting a connection to the wired subscriber unit responsive to the call number by the IWF system;

reporting the requested connection to a control unit by the wired subscriber unit;

connecting a communication path for the requested connection by the wired subscriber unit;

informing the connection of the communication path to the IWF system by the wired subscriber unit;

connecting to the communication path by the IWF system;

establishing a wired subscriber path between the IWF system and the wired subscriber unit; and, reporting the establishment of the wired subscriber path to the control unit.

It is preferable that the step of reporting further comprises a step of displaying the identification of the wireless subscriber unit to the control unit.

It is preferable in the embodiment that the step of establishing the connected path as a wireless subscriber path comprises a step performing modem negotiation between the wireless subscriber unit and the IWF system.

A third preferable embodiment of a method for testing the functions of an interworking function (IWF) system according to the present invention having a circuit call generator, wherein the circuit call generator having at least one wireless subscriber unit and at least one wired subscriber unit for transmitting/receiving test information to/from the IWF system, the method comprising the steps of:

transmitting a first string of arbitrary characters by the wireless subscriber unit of the circuit call generator to the IWF system via a wireless subscriber path, wherein the wireless subscriber path provides a communication path between the wireless subscriber unit of the circuit call generator and the interworking function system;

returning the transmitted first string of arbitrary characters after modulation by the interworking function system via the wired subscriber path to the wired subscriber unit, wherein the wired subscriber path provides a communication path between the wired subscriber unit of the circuit call generator and the IWF system;

reporting the receipt of the first string of arbitrary characters to a control unit after modulation by the wired subscriber unit;

transmitting a second string of arbitrary characters by the wired subscriber unit via the wired subscriber path to the IWF system;

returning the transmitted second string of arbitrary characters string by the IWF system after conversion by wireless data protocol via the wireless subscriber path to the wireless subscriber unit; and reporting the receipt of the transmitted second string of arbitrary characters to the control unit by the wireless subscriber unit after reconversion by wireless data protocol.

It is preferable that the step of reporting further comprises a step of displaying the string of arbitrary characters, the identification number of the wireless subscriber unit and the wired subscriber unit to the control unit.

It is also preferable that the step of reporting further comprises a step of displaying the string of arbitrary characters of the wired subscriber unit to the control unit.

A fourth preferable embodiment of a method for testing the functions of an interworking function (IWF) system according to the present invention having a circuit call generator, wherein the circuit call generator having at least one wireless subscriber unit and at least one wired subscriber unit for transmitting/receiving test information to/from the IWF system, the method comprising the steps of:

requesting the interworking function system to release a call connection between the wireless unit and the IWF system;

in response to the release request, sending an acknowledgement by the interworking function system to the wireless subscriber unit;

in response to the acknowledgement from the interworking function system, informing a control unit that the call connection in the wireless subscriber path is to be released and releasing the path of the call connection in the wireless subscriber path;

reporting the release of the call connection in the wireless subscriber path to the control unit by the wireless subscriber unit;

in response to the request for the release request by the wireless subscriber unit, releasing a communication path between a wired subscriber unit and the IWF system in a wired subscriber path;

informing the control unit by the wired subscriber unit that the communication path in the wired subscriber path is to be released, and releasing the communication path in the wired subscriber path; and, reporting the release of the communication path in the wired subscriber path to the control unit and to the IWF system.

It is preferable that the step of reporting further comprises a step of displaying the identification number of the wireless subscriber unit and the wired subscriber unit.

Figure 3:
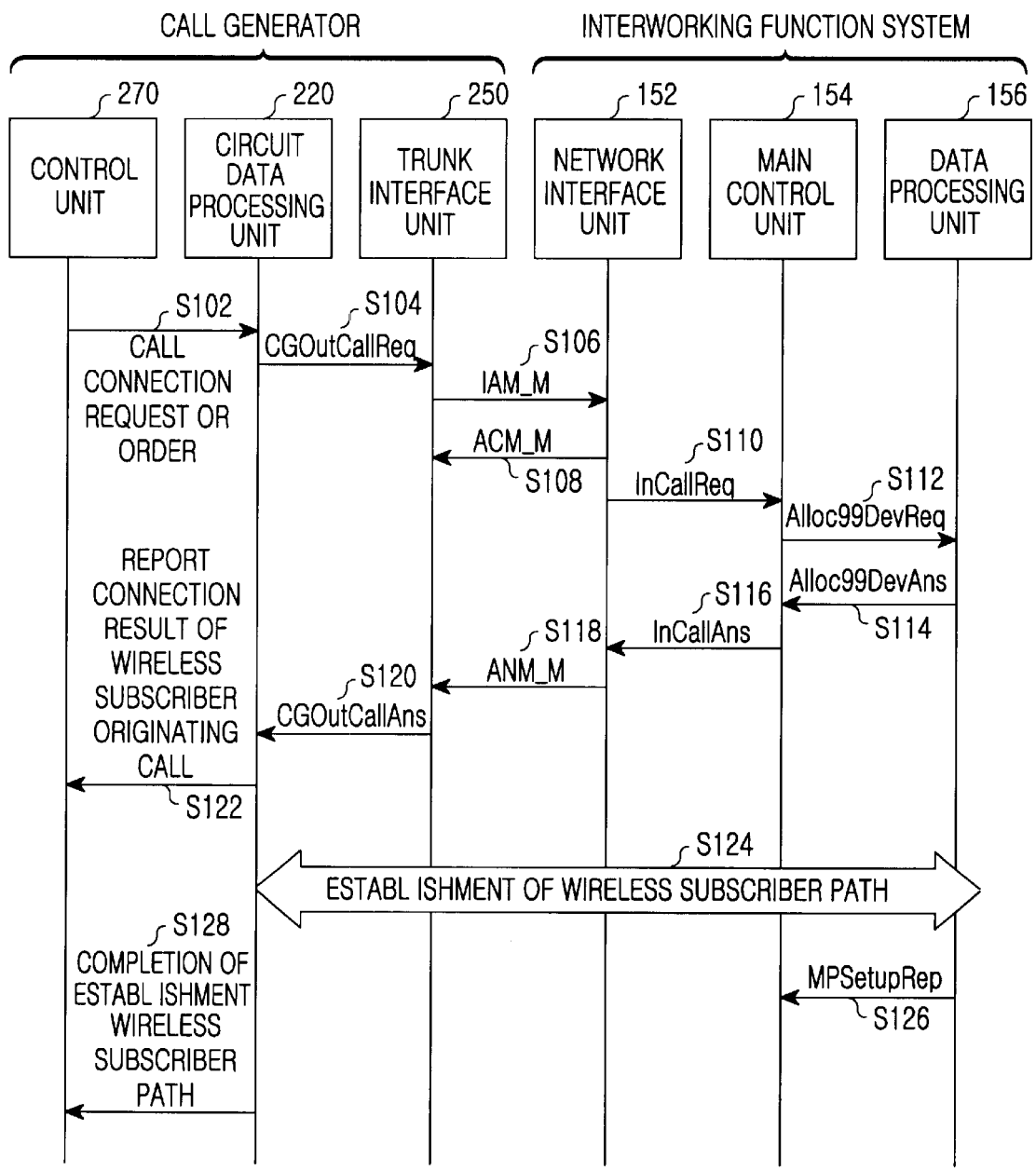
FIG. 3 shows a view of the message flow chart illustrating the test processes for originating call of a wireless subscriber by the circuit call generator in accordance with the present invention.

Referring to FIG. 2 and FIG. 3, the steps of testing a call connection process by the wireless subscriber using the circuit call generator in accordance with the present invention are described in detail as follow. In step s102, the control unit (270) transmits an order of requesting for a call connection to the wireless subscriber unit (230) of the circuit data processing unit (220) via trunk (1). The order of requesting for call connection includes an identifier (ID) of the calling mobile station and information relating to which type of service option is requested, i.e. a radio data communication service. The wireless subscriber unit receives this order of requesting the call connection via trunk (1), and transmits an out call request message (CGOutCallReq) to the trunk interface unit (250) via a VME bus, in step s104.

In step s106, the trunk interface unit (250), in response to the CGOutCallReq message from the wireless subscriber unit (230), transmits an initial address message (IAM) via one of the channels in the trunk (1) for connecting the wireless subscriber to the network interface unit (152) of the interworking function system (150). The IAM message is defined under the signaling system 7, and includes the calling mobile station number, the assigned trunk channel number, and the information indicating what type of calling requested by the wireless subscriber (230). In step s108, in response to the IAM message from the trunk interface unit (250), the network interface unit (152) transmits an address complete message (ACM) to the trunk interface unit (250) for acknowledging the receipt of the IAM message.

In steps s110, s112, s114, and s116, the interworking function (IWF) system processes the request for call connection request from the wireless subscriber, and initiates the call connection. The call control process within the interworking function system is well known in the art and is out of the subject matter of the present invention, thus, the detailed description is omitted. If the initiation of call connection is completed, the network interface unit (152) of the interworking function (IWF) system sends an answer message (ANM) as a response, indicating a path for call connection to the trunk interface unit (250) is completed, in step s118.

In step s120, the trunk interface unit (250) transmits an out call answer (CGOutCallAns) message, in response to the ANM message from the network interface unit (152), to the wireless subscriber unit (230) of the circuit data processing unit (220) and assigns the CGOutCallAns message to one of the channels in the time division multiple bus (260), using a time switch thereon. Thus, the CGOutCallAns message contains the information about the time division multiple channel assigned by the trunk interface unit (250). Then, in response to the CGOutCallAns message from the trunk interface unit (250), the wireless subscriber unit (230), in step s122 is connected to the time switch to the time division multiple channel assigned by the CGOutCallAns message, and reports to the control unit (270) that the wireless subscriber's call connection is completed with the IWF system. The control unit (270) outputs the result of the wireless subscriber's call connection by displaying the telephone number of the wireless subscriber on a screen.

In step s124, the wireless subscriber unit (230) establishes a wireless subscriber path with the data processing unit (156) of the interworking function system (150). Then, in step s126, the data processing unit (156) transmits a setup response (MPSetupRep) message to the main control unit (154) of the interworking function system (150) to acknowledge that the establishment of wireless subscriber path is completed. In step s128, the wireless subscriber unit (230) reports to the control unit (270) that the established wireless subscriber path is completed. The control unit (270) outputs the result of the establishment of the wireless subscriber path by displaying the telephone number of the wireless subscriber on the screen. As stated in the above, the call generator (200) can determine whether the call connection between the wireless subscriber unit (230) and the IWF system (150) is properly completed.

After establishing the wireless subscriber path with the IWF system, the IWF system searches for the destination number of the wired subscriber by analyzing the called number included in the calling request message from the wireless subscriber unit (230). Thus, the IWF system requests the wired subscriber unit (240) of the circuit data processing unit (220) to be connected for a communication link. The number for both the wireless subscriber unit (230) and the wired subscriber unit (240) are pre-assigned. Thus, the control unit (270) after assigning the pre-assigned call number for the wireless subscriber unit also sets the pre-assigned call number for the wired subscriber unit so that the circuit call generator (200) can process not only the connecting the wireless subscriber but also connecting the wired subscriber.

Figure 4:
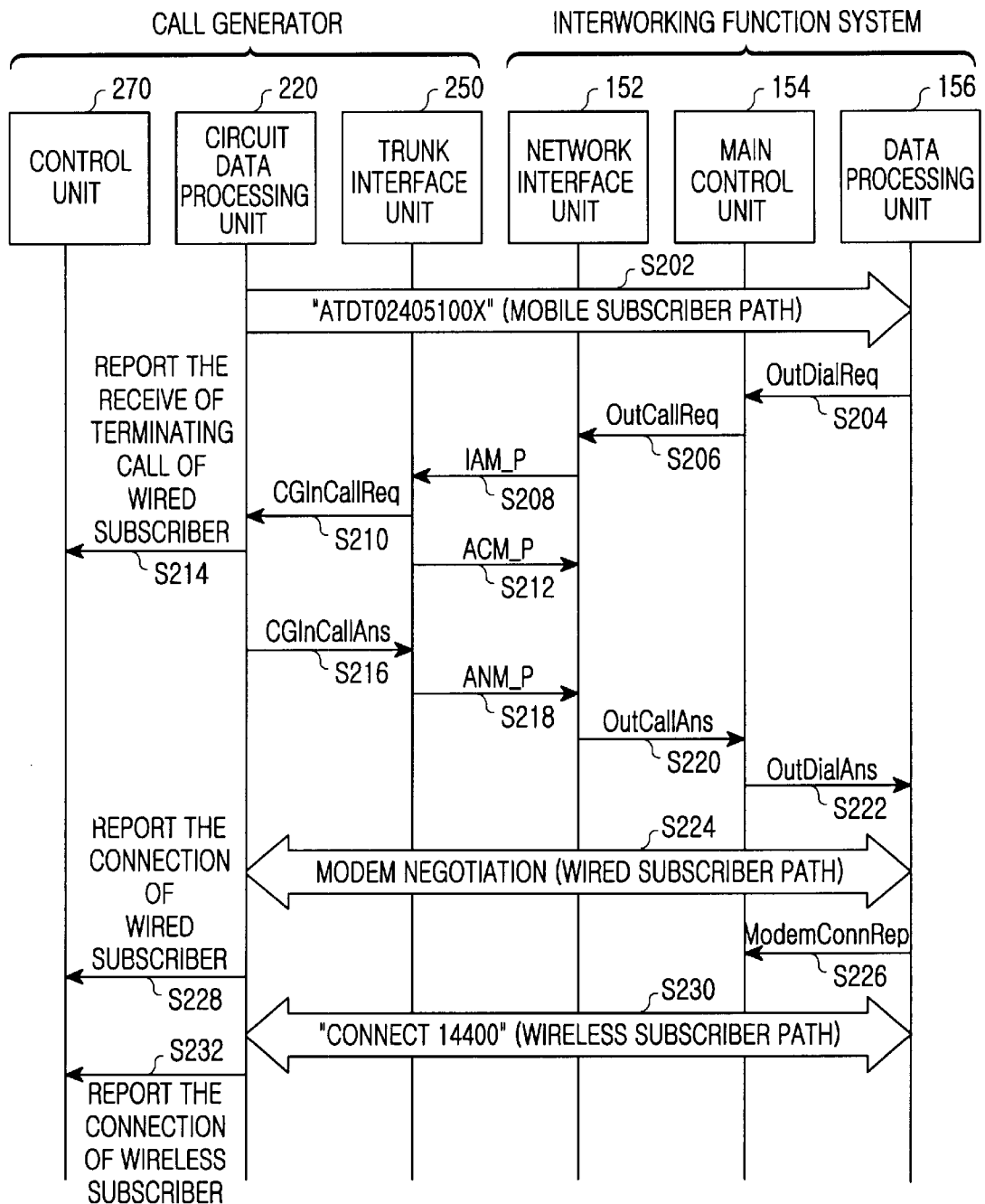
FIG. 4 shows a view of message flow illustrating the test processes for the call connection of a wired subscriber in accordance with the present invention.

Referring to FIG. 4, the steps of testing the path connection of the wired subscriber in accordance with the present invention are described as follows. In step s202, the wireless subscriber unit (230) of the circuit data processing unit (220) transmits a call number, "02405100X" of the wired subscriber to the data processing unit (156) of the interworking function system (150) via the wireless subscriber path established in the step s124 of FIG. 3. The data processing unit (156) processes to identify the destination of the received number, and in steps s204 and s206, requests for the connection to the identified wired subscriber unit (240). The network interface unit (152) receives the request for the connection, and transmits an initial address (IAM) message to the trunk interface unit (250) of circuit call generator to be connected to the identified wired subscriber unit (240), in step s208.

In response to the IAM messages from the network interface unit (152), the trunk interface unit (250) assigns a channel to be used by the wired subscriber path in the time division multiple bus, and sends an incall request (CGInCallReq) message for requesting the call connection to the wired subscriber unit (240), in step s210. The CGInCallReq message includes the information of the time division multiple channel assigned by the trunk interface unit (250). Then, the trunk interface unit (250), in step s212, send an acknowledgement (ACM) message to the network interface unit (152) for informing that the call connection is in progress.

In step s214, the wired subscriber unit (240) reports to the control unit 270 that the call connection is requested, and connects the time switch to the time division multiple channel assigned in the CGInCallReq message. The control unit (270) outputs the wired subscriber unit number to indicate that the call connection is requested on a screen. The wired subscriber unit (240), in step s216, sends the CGInCallReq message as a response to the call connection. In step s210, the trunk interface unit (250) connects the time switch to the assigned time division multiple channel and sends an answer message (ANM_P) to the network interface unit (152) to inform that the path connection of the call connection is completed.

In steps s220 and s222, the interworking function system connects the path for the call connection between the interworking function system (150) and the circuit call generator (200), and a modem negotiation is performed between the modem of the wired subscriber unit and the modem of the data processing unit (156). During this step, a wired subscriber path is established. Then, the data processing unit (156) sends a modem connection reply (ModemConnRep) message to the main control unit (154) to inform that the modem connection is completed in step s226. Simultaneously, the wired subscriber unit (240) reports the completion of modem connection to the control unit (270) in step s228. The control unit (270) outputs the completion of modem connection by displaying the identification number of the wired subscriber on the screen.

In step s230, the data processing unit (156) reports the completion of call connection to the wired subscriber unit (230) via the wireless subscriber path established in the step s124 in FIG. 3. In step s232, the wireless subscriber unit reports to the control unit (270) that the wired subscriber path is connected. The control unit (270) outputs the result of modem connection by displaying the identification number of wired subscriber unit on the screen.

Figure 5:
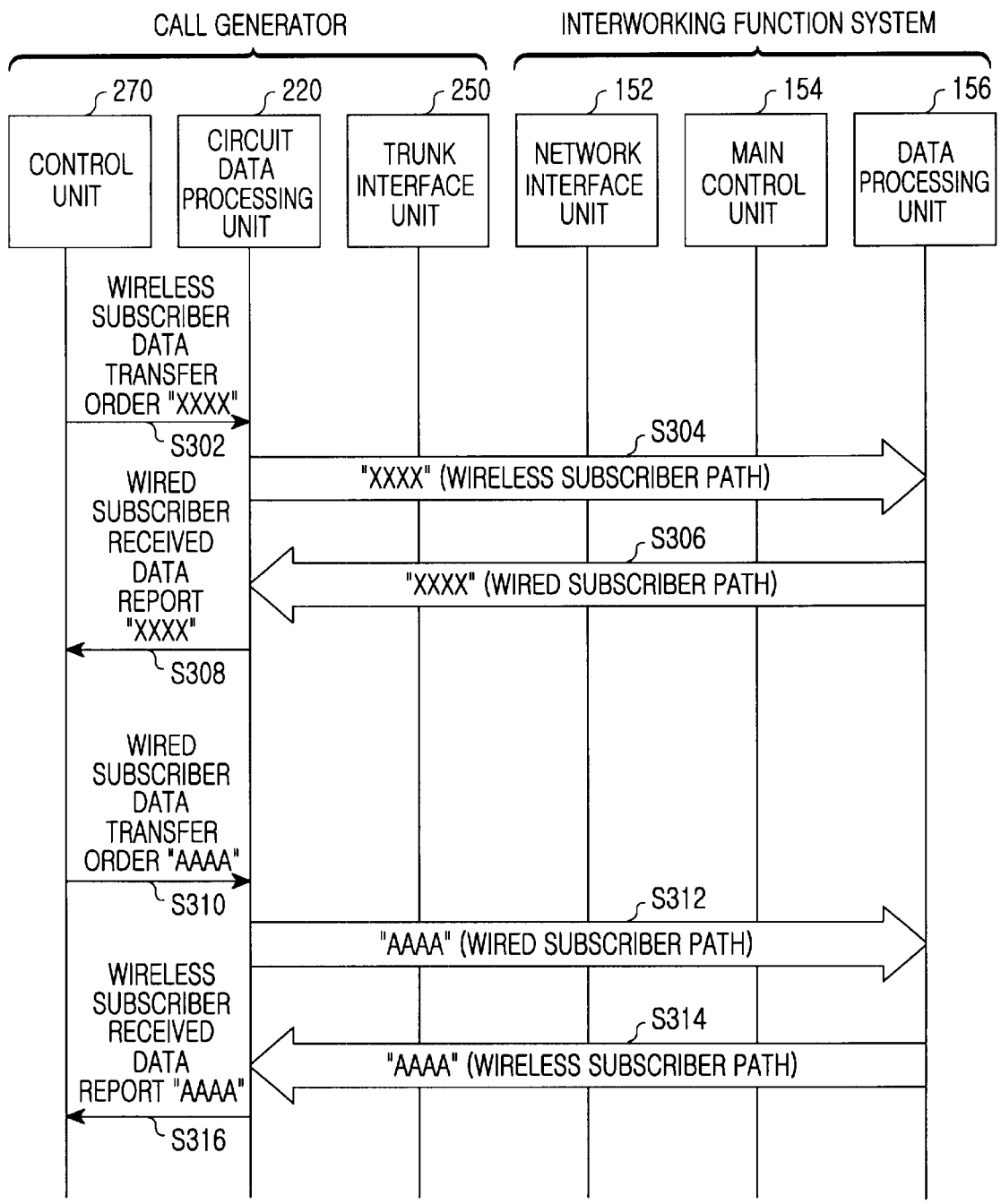
FIG. 5 shows a view of message flow illustrating the test processes for data transmission in accordance with the present invention; and, FIG. 6 shows a view of message flow illustrating the test processes for the call release of a wireless subscriber in accordance with the present invention.

If the wireless subscriber path and the wired subscriber path are established through the above stated steps explained in FIG. 3 and FIG. 4, the circuit call generator (200) and the interworking function system (150) can now exchange data therebetween. Referring to FIG. 5, the steps of data transmission of the circuit call generator in accordance with the present invention is described as follows. In step s302, the control unit (270) orders the wireless subscriber unit (230) of the circuit data processing unit (220) to transmit data. For example, the control unit orders to transmit a string of characters, "XXXX." In step s304, the wireless subscriber unit transmits, "XXXX," after modulation to the data processing unit (156) of the interworking function system (150) via the wireless subscriber path established in the step s124 in FIG. 3. Then, in step s306, the data processing unit (156) relays the string of characters, "XXXX," after modulation to the wired subscriber unit (240) of the circuit data processing unit (220) via the wired subscriber path established in the step s224 in FIG. 4. In step s308, the wired subscriber unit (230) reports the receipt of the string of characters, "XXXX," to the control unit (270). Then, the control unit (270) outputs the received string of characters along with the identification number of the wired subscriber. Therefore, by comparing the transmitted character with the received character, it can be tested to determined whether the IWF system is working properly.

Similarly, in step s310, the control unit (270) commands the wired subscriber unit (240) of the circuit data processing unit (220) to transmit data. For example, the control unit orders to transmit a string of characters, "AAAA." In step s312, the wired subscriber unit (240) transmits "AAAA" after conversion by wireless data protocol to the data processing unit (156) of the interworking function system (150) via the wired subscriber path established in the step s224 in FIG. 4. Then, in step s314, the data processing unit (156) relays the same string of characters, "AAAA," to the wireless subscriber unit (230) of the circuit data processing unit (220) via the wireless subscriber path established in the step s124 in FIG. 3. Then, in step s316, the wireless subscriber unit (230) reports the received, "AAAA," to the control unit (270) after reconversion by wireless data protocol. The control unit (270) outputs the received characters along with the telephone number of the wireless subscriber on a screen. Thus, by comparing the transmitted characters and the received characters, it can be determined whether the IWF system is working properly.

After the call is established and the data transmission is completed, the circuit call generator (200) commands the interworking function system to release the call. This specification illustrates a step of testing the call release by the wireless subscriber.

Figure 6:
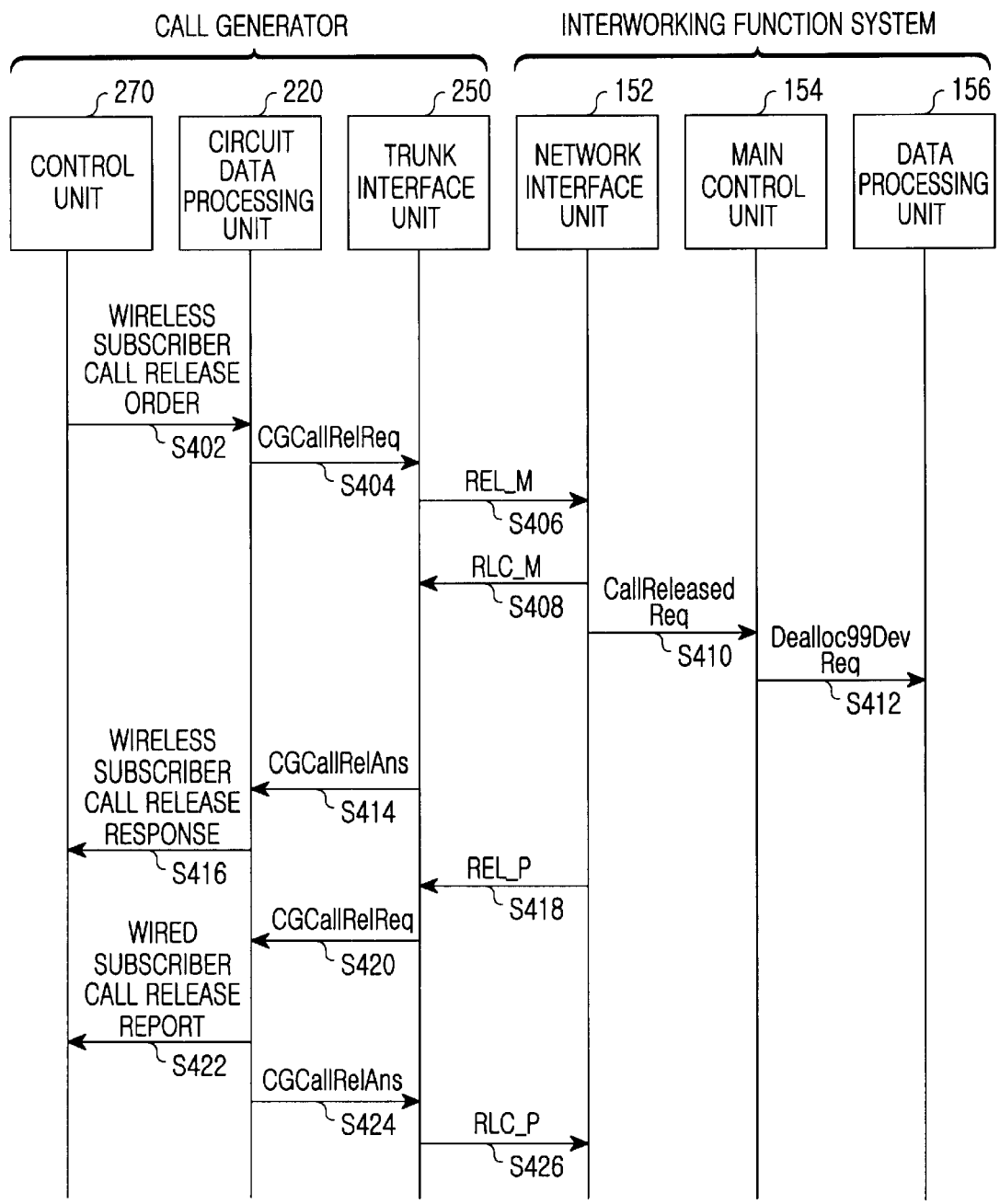

Referring to FIG. 6, a step of testing the call release of the circuit call generator in accordance with the present invention is as follows. In step s402, the control unit (270) orders the wireless subscriber unit (230) of the circuit data processing unit (220) to release the call. In step s404, the wireless subscriber unit (230) sends a call release request (CGCallRelReq) message to the trunk interface unit (250). In step s406, in response to the CGCallRelReq message, the trunk interface unit (250) sends a release (REL_M) message to request for call release to the network interface unit (152) of the interworking function system (150). The network interface unit (152) receives the REL_M message and transmits a release complete (RLC_M) message, in response to the REL_M message, to the trunk interface unit (250) in step s408.

In response to the RLC M message from the network interface unit (250), the trunk interface unit (250) transmits a call release answer (CGCallRelAns) message to inform the release of the communication path to the wireless subscriber unit (230), via wireless subscriber path established in step s124 in FIG. 3, and releases the time switch connection with the wireless subscriber in step s414. The wireless subscriber unit (230), in step s416, reports to the control unit (270) that the call of the wireless subscriber is released. The control unit (270) outputs the call release result of the wireless subscriber on a screen by displaying the telephone number of the released wireless subscriber unit.

The network interface unit (152) also transmits a release (RLC_P) message in step s418 to the trunk interface unit (250) of the call generator (200). In step s420, the trunk interface unit (250) transmits a call release request (CGCallRelReq) message to the wired subscriber unit (240), via the wired subscriber path established in step s224 in FIG. 4. In step s422, the wired subscriber unit (240), in response to the CGCallRelReq message received from the trunk interface unit (250), reports the completion of the call release to the control unit (270). The control unit (270) displays the report of the call release and the identification number of the wired subscriber unit (240) on a screen. Simultaneously, in step s424, the wired subscriber unit (240) transmits a call release answer (CGCallRelAns) message to the trunk interface unit (250) for releasing the time switch connected with the wired subscriber unit (240). In step s426, the trunk interface unit (250) transmits a release complete (RLC_P) message to the network interface unit (152) of the interworking function system (150) and releases the time switch connected with the wired subscriber unit (240).

In conclusion, the circuit call generator in accordance with the present invention can reduce complex network test points and complex test devices, which makes the test operation more economical. By performing the call control for a plurality of wired subscribers and wireless subscribers, it is possible to test the capacity of the interworking function (IWF) system and determine whether the normal path of communication of the IWF system is working properly.

What is claimed is:

1. An apparatus for testing interworking function (TWF) system, said apparatus comprising:
   a trunk interface unit having a plurality of time switches defining transmission channels operatively coupled to said IWF system for transmitting communication signals therebetween;
   a circuit data processing unit operatively coupled to said IWF system via said trunk interface unit;
   a control bus operatively coupled to said circuit data processing unit and said trunk interface unit for transmitting control signals between said circuit data processing unit and said trunk interface unit;
   a data bus being a time division multiplex structure and operatively coupled to said circuit data processing unit and said trunk interface unit for transmitting data signals between said circuit data processing unit and said trunk interface unit via said transmission channels of said trunk interface unit;
   a control unit having a display means operatively coupled to said circuit data processing unit for transmitting and/or receiving test information to/from said interworking function system;
   at least one wireless subscriber unit for emulating a role of an actual wireless subscriber, and
   at least one wired subscriber unit for emulating a role of actual wired subscriber, wherein each of said at least one wireless subscriber unit and said at least one wired subscriber unit being assigned to one of said transmission channels of said trunk interface unit.

2. The apparatus as set forth in claim 1, wherein said circuit data processing unit comprises a plurality of switches to establish the communication channel to said data bus.

3. The apparatus as set forth in claim 1, wherein said control unit generates said test information to said IWF system in accordance with a predetermined call-generating scenario and displays the result of said test information to said display means.

4. A method for testing the functions of an interworking function (IWF) system having a circuit call generator, wherein said circuit call generator having at least one wireless subscriber unit and at least one wired subscriber unit for transmitting/receiving test information to/from said IWF system, said method comprising the steps of:
   (a) requesting a call connection to said IWF system by said wireless subscriber unit;
   (b) initiating call connection by said IWF system responsive to said requested call connection;
   (c) informing said wireless subscriber that a path for said call connection is completed by said IWF system;
   (d) connecting the path for said call connection by said wireless subscriber unit;
   (e) reporting the completion of said call connection to a control unit;
   (f) establishing a wireless subscriber path between said wireless subscriber unit and said IWF system; and,
   (g) reporting the establishment of said wireless subscriber path to said control unit that by said IWF system.

5. The method as set forth in claim 4, wherein said step (e) further comprises a step of displaying the telephone number of said wireless subscriber unit to said control unit.

6. The method as set forth in claim 4, wherein said step (g) further comprises a step of displaying the telephone number of said wireless subscriber unit to said control unit.

7. A method for testing the functions of an interworking function (IWF) system having a circuit call generator, wherein said circuit call generator having at least one wireless subscriber unit and at least one wired subscriber unit for transmitting/receiving test information to/from said IWF system, said method comprising the steps of:
   (a) transmitting a call number to said IWF system via a predetermined wireless subscriber path by said wireless subscriber unit;
   (b) requesting a connection to said wired subscriber unit responsive to said call number by the IWF system;
   (c) reporting said requested connection to a control unit by said wired subscriber unit;
   (d) connecting a communication path for said requested connection by said wired subscriber unit;
   (e) informing said connection of said communication path to said IWF system by said wired subscriber unit;
   (f) connecting to said communication path by said IWF system;
   (g) establishing a wired subscriber path between said IWF system and said wired subscriber unit; and,
   (h) reporting the establishment of said wired subscriber path to said control unit.

8. The method as set forth in claim 7, wherein said step (c) further comprises a step of displaying the identification number of said wired subscriber unit to said control unit.

9. The method as set forth in claim 7, wherein said step (h) further comprises a step of displaying the identification number of said wired subscriber unit to said control unit.

10. The method as set forth in claim 7, wherein said step (g) comprises a step of establishing a wired subscriber path by performing modem negotiation between the called subscriber unit and said interworking function system.

11. A method for testing the functions of an interworking function (IWF) system having a circuit call generator, wherein said circuit call generator having at least one wireless subscriber unit and at least one wired subscriber unit for transmitting/receiving test information to/from said IWF system, said method comprising the steps of:
   (a) transmitting a first string of arbitrary characters by said wireless subscriber unit to said IWF system via a wireless subscriber path, wherein said wireless subscriber path provides a communication path between said wireless subscriber and said IWF system;
   (b) returning said transmitted first string of arbitrary characters by said IWF system via a wired subscriber path to said wireless subscriber unit, wherein said wired subscriber path provides a communication path between said wired subscriber unit and said IWF system;
   (c) reporting the receipt of said first string of arbitrary characters to a control unit by said wired subscriber unit;
   (d) transmitting a second string of arbitrary characters to said IWF system by said wired subscriber unit via said wired subscriber path;
   (e) returning said transmitted second string of arbitrary characters string to said wireless subscriber unit by said IWF system via said wireless subscriber path; and, (f) reporting the receipt of said transmitted second string of arbitrary characters to said control unit by said wireless subscriber unit.

12. The method as set forth in claim 11, wherein said step (c) further comprises a step of displaying said first string of arbitrary characters and the identification number of said wired subscriber unit to said control unit.

13. The method as set forth in claim 11, wherein said step (f) further comprises a step of displaying said second string of arbitrary characters and the telephone number of said wireless subscriber unit to said control unit.

14. A method for testing the functions of an interworking function (IWF) system having a circuit call generator, wherein said circuit call generator having at least one wireless subscriber unit and at least one wired subscriber unit for transmitting/receiving test information to/from said IWF system, said method comprising the steps of:

(a) requesting said IWF system to release a call connection between said wireless unit and said IWF system;

(b) in response to said release request, sending an acknowledgement by the IWF system to said wireless subscriber unit;

(c) in response to said acknowledgement from said IWF system, informing a control unit that said call connection in a wireless subscriber path is to be released;

(d) releasing the path of said call connection in said wireless subscriber path;

(e) reporting the release of said call connection in said wireless subscriber path to said control unit by said wireless subscriber unit;

(f) in response to said request for said release request by said wireless subscriber unit, releasing a communication path between a wired subscriber unit and said IWF system in a wired subscriber path;

(g) informing said control unit by the wired subscriber unit that said communication path in said wired subscriber path is to be released, and releasing said communication path in said wired subscriber path; and, (h) reporting the release of said communication path in said wired subscriber path to said control unit and to said IWF system.

15. The method as set forth in claim 14, wherein said step (e) further comprises a step of displaying the telephone number of said wireless subscriber unit.

16. The method as set forth in claim 14, wherein said step (h) further comprises a step of displaying the identification number of said wired subscriber unit.

* * * * *